United States Patent [19]
Chestnutt

[11] 3,829,237
[45] Aug. 13, 1974

[54] VARIABLY POSITIONED GUIDE VANES FOR AERODYNAMIC CHOKING

[75] Inventor: David Chestnutt, Newport News, Va.

[73] Assignee: The United States of America as represented by the Administrator of the National Aeronautics and Space Administration, Washington, D.C.

[22] Filed: June 27, 1972

[21] Appl. No.: 266,820

[52] U.S. Cl............................. 415/181, 137/15.1
[51] Int. Cl. ...... F02k 11/00, F01d 1/02, F01d 9/00
[58] Field of Search...... 137/15.1, 15.2; 181/33 HA; 415/181; 60/39.29

[56] References Cited
UNITED STATES PATENTS

| | | | |
|---|---|---|---|
| 2,805,818 | 9/1957 | Ferri | 415/181 |
| 2,806,350 | 9/1957 | Hoffmann | 60/39.29 |
| 3,583,417 | 6/1971 | Clark | 137/15.1 |
| 3,610,262 | 10/1971 | Wise | 137/15.1 |

Primary Examiner—Carlton R. Croyle
Assistant Examiner—Louis J. Casaregola
Attorney, Agent, or Firm—Howard J. Osborn; John R. Mannin

[57] ABSTRACT

A choking device to cause a sonic barrier to be formed which reduces the transmission of noise in a direction opposed to the direction of air flow in a compressor that may be part of an aircraft gas turbine engine. The noise reduction is accomplished by proper shaping and movement of inlet guide vanes, and an actuator is connected to selected guide vanes to effect movement thereof by programmed amounts as required to choke or partially choke within the design range of the axial-flow-air compressor.

7 Claims, 6 Drawing Figures

SECTION A-A

PATENTED AUG 13 1974  3,829,237

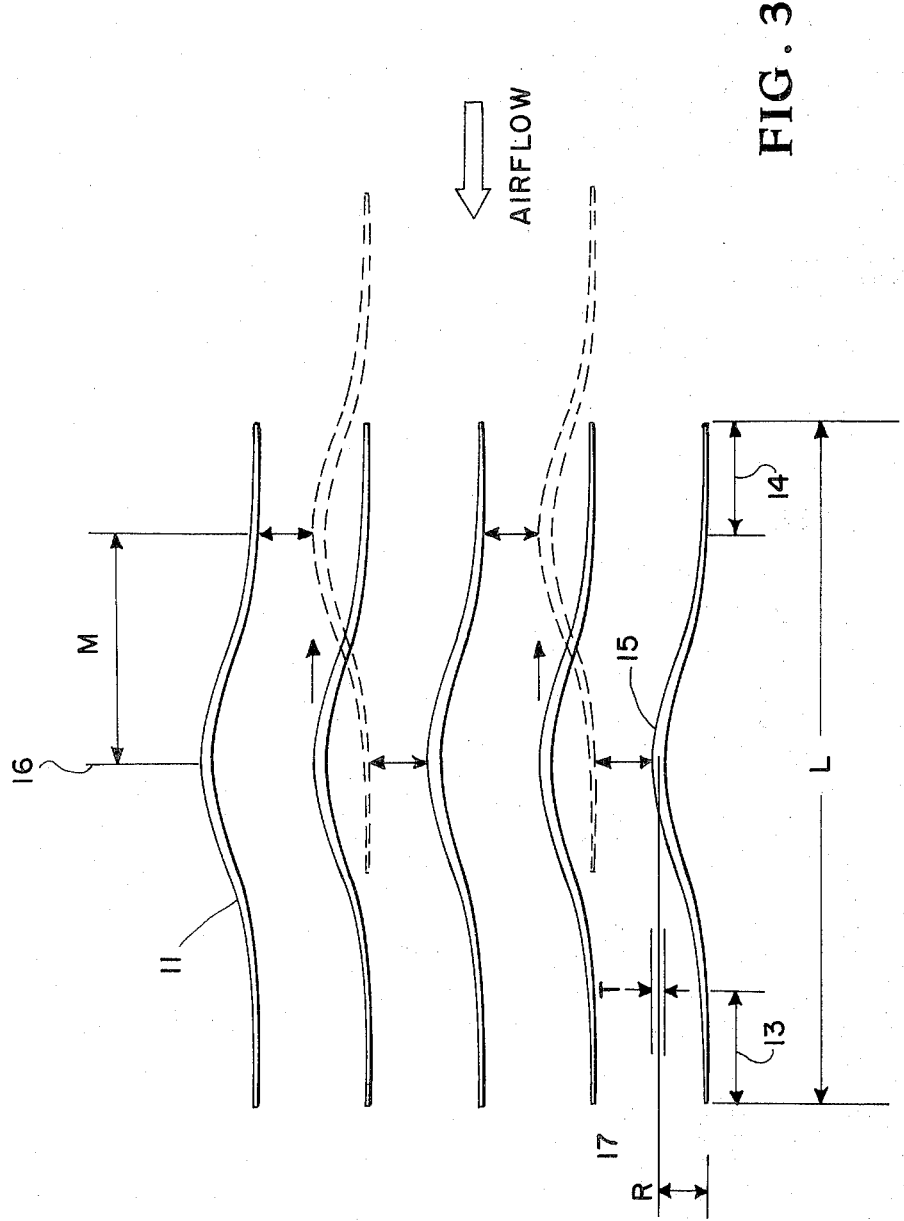

SECTION A-A

SECTION A-A

VARIABLY POSITIONED GUIDE VANES FOR AERODYNAMIC CHOKING

BACKGROUND OF THE INVENTION

1. Field of the Invention

This invention relates to inlet guide vanes of an axial-flow-air compressor which are shaped and selectively movable to cause either aerodynamic choking or partial choking to occur, to reduce the transmission of noise. It has particular utility for use on inlets of aircraft engines although it could be used in any duct to attenuate noise being transmitted upstream through the air and the duct.

2. Description of the Prior Art

The prior art includes devices by which noise reduction in systems such as an aircraft gas turbine engine having axial-flow compressors may be obtained by inlet choking. Inlet choking in the past has been accomplished through reduction of the inlet area by (1) causing the outside diameter of the inlet to contract, (2) axial movement of a variable diameter centerbody and (3) installation of different thickness inlet guides. These prior art techniques however have disadvantages. For example, technique (1) above requires the use of relatively complex and heavy equipment. Further, the aerodynamic losses in the unchoked configurations are excessive. Technique (2) above comprises a somewhat simpler procedure, but requires the use of relatively long centerbodies for the diffusion losses to be acceptable. Further, the noise reduction is less than that normally obtained by other choking means. Technique (3) above does not provide for variation of inlet guide vane thickness and therefore has limited practical value.

Another prior art device is shown in the Jerie et al. U.S. Pat. No. 3,270,953, which discloses a fixed blade arrangement to reduce the operating noise of axial-flow compressors by using a specific ratio of the number of rotor blades to the number of stator blades, and by selecting angular relationships of the edges of the rotor and stator blades. It is also known that vanes may be used to provide a variable area turbine entrance nozzle, wherein the vanes are pivotable to vary the flow area (Paetz U.S. Pat. No. 2,819,732), and that blades may be adjustable in an turbo-compressor type gas engine to control air flow where the sound frequencies are indicative of operational characteristics of the device (Warden et al. U.S. Pat. No. 3,245,219).

SUMMARY OF THE DISCLOSURE

The disadvantages and limitations of the prior art are solved by the instant invention which provides a simple and reliable means of reducing the noise transmission from the inlet of an axial-flow-air compressor, which may be part of an aircraft gas turbine engine. This noise reduction is accomplished by proper shaping and movement of the inlet guide vanes to cause either aerodynamic choking or partial choking to occur, whichever is required. Aerodynamic choking causes a sonic barrier to be formed which reduces the transmission of noise in a direction opposed to the direction of air flow.

The invention comprises a plurality of inlet guide vanes, alternate ones of which are movable to selectively effect the choked and unchoked condition. Furthermore, the guide vanes are contoured and shaped to optimize their effectiveness.

The advantages of the invention over the prior art are: (1) the device is capable of choking or partially choking over the entire operating range of a compressor during operation, (2) it is much simpler, (3) is requires less weight, (4) it is more economical to install, and (5) the unchoked configuration is capable of operating at smaller aerodynamic losses than other type choking devices.

BRIEF DESCRIPTION OF THE DRAWINGS

FIG. 3 shows a plurality of guide vanes in an air flow path, alternate ones of which are movable, according to the invention;

DETAILED DESCRIPTION OF THE INVENTION

Figure 1:
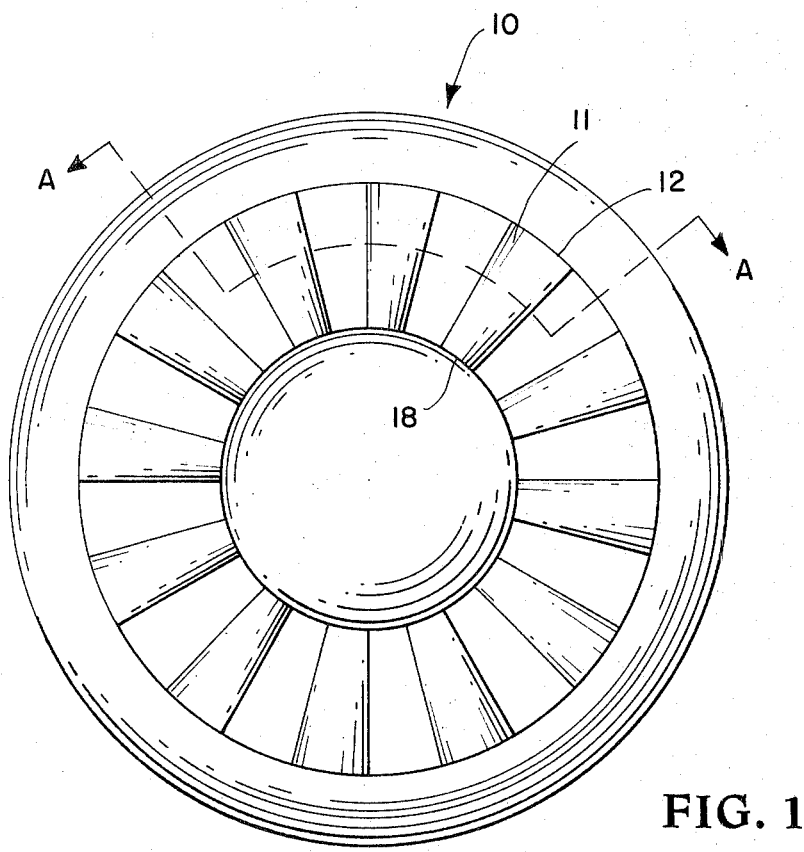
FIG. 1 is a front view of an axial-air-flow compressor inlet.
Figure 2:
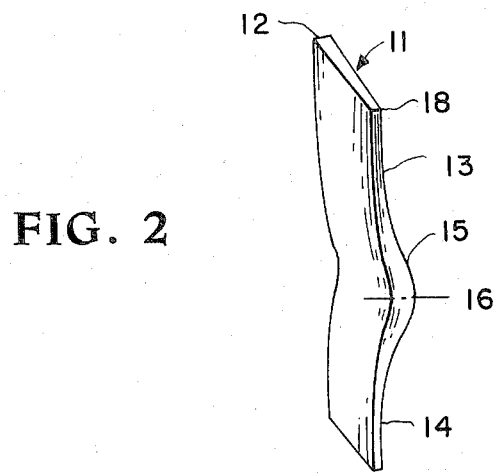
FIG. 2 is a perspective view of the configuration of a guide vane according to the invention.

FIG. 1 shows a front view of inlet 10 of a conventional axial-air-flow compressor having a plurality of guide vanes 11 symetrically arranged about the longitudinal axis thereof. The structure of an individual guide vane 11 is shown in perspective view in FIG. 2. The guide vanes are relatively thin and taper outwardly in frontal dimension from their inner position 18 to their outer position 12, in inlet 10.

The operation of one embodiment of the guide vane structure according to the invention, may be described with respect to FIG. 3 which shows the side position of a series of five guide vanes 11 arranged in the air flow path. Each guide vane 11 consists of an elongated and relatively thin structure having a slight curve. With respect to FIGS. 2 and 3, each guide vane 11 comprises a substantially symmetrical elongated parabolic structure having substantially straight end sections 13 and 14 and curved center section 15. The longitudinal axis of ends 13 and 14 are located in the same plane. The thickness of guide vanes 11 increases from the extremities of ends 13 and 14 towards the geometrical center 16 of the guide vanes, which is also the crest of curved portion 15.

The thickness of guide vanes 11 at point 16 is designated T, and the length of the guide vanes 11 is designated L. The longitudinal distance between the points at which ends 13 and 14 start to curve and the geometrical center 16 of the guide vanes is designated M. The lateral distance between the extremities of ends 13 and 14 and the midpoint 17 of the thickness dimension of guide vanes at point 16, is designated R. Ends 13 and 14 are substantially straight for a distance L/7.

The dimensions R, T and L are determined depending upon the particular installation. The dimensions R and M depend upon the minimum air flow at which choking is required. The dimensions R and L depend upon the maximum deflection of the airstream before separation occurs. The dimension T depends upon the maximum air flow at which choking is not required. The guide vanes can be easily designed to allow for a maximum air flow rate without choking during normal operation and yet cause the choked condition, in a manner described hereinafter, at a minimum air flow rate whenever large noise reductions are required.

The manner in which the choked condition is obtained in the guide vane embodiment shown in FIG. 3 may be described with respect to the guide vane positions indicated by the broken and solid lines. The solid line positions of the guide vanes indicate the unchoked condition. By moving alternate guide vanes 11 towards the right a predetermined distance, the desired choked condition can be obtained. Thus it is seen with reference to FIG. 3 that by moving two of the five guide vanes a predetermined distance into the air flow path, to the position designated by the broken line designation of the guide vanes so moved, the choked condition is attained wherein the air flow is constricted. By so moving alternate guide vanes to the choked condition, a minimum air-flow rate will be provided whenever large noise reductions are required. It should be understood that the definition of alternate guide vanes includes other arrangements, such as every third or fourth vane being movable.

Figure 4A:
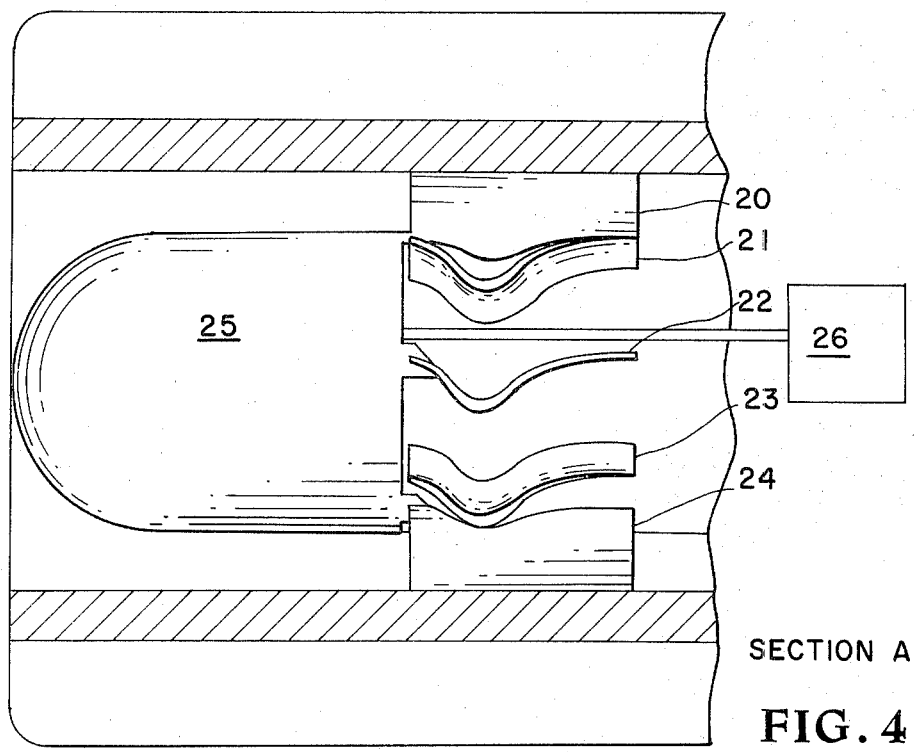
FIGS. 4(a) and 4(b) are taken along section lines A—A of FIG. 1, and respectively show the unchoked and choked positions of the guide vanes of the FIG. 3 configuration.
Figure 4B:
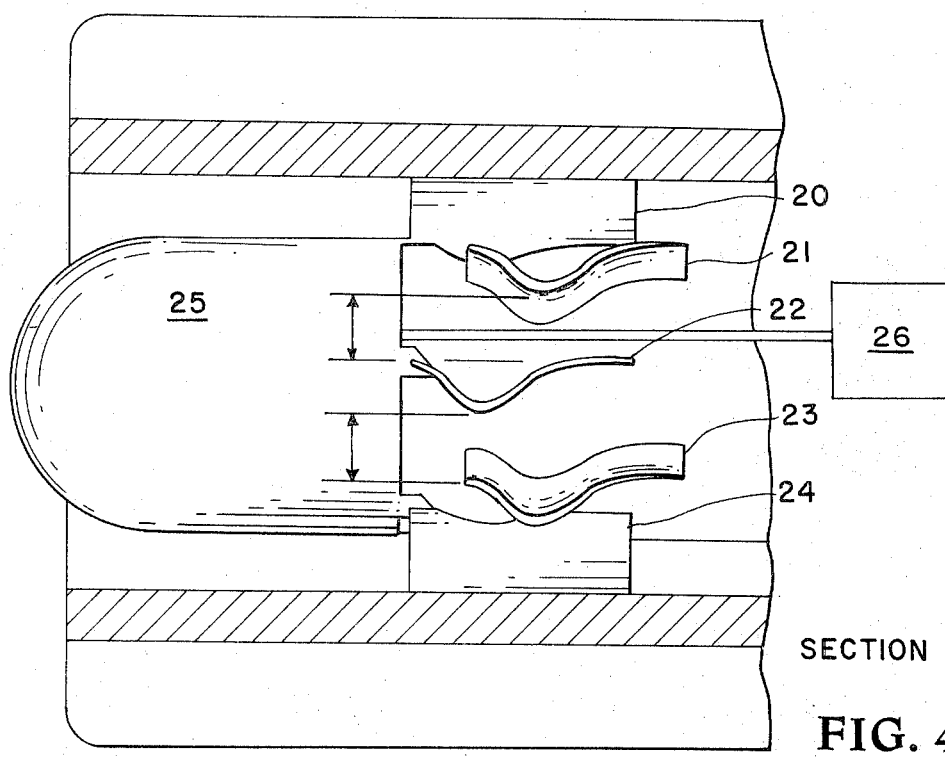

An actuating mechanism that may be employed to move the guide vanes between choked and unchoked conditions is shown in FIGS. 4(a) and 4(b) of the drawings. FIG. 4(a) shows the unchoked position, wherein guide vanes 20 through 24 are aligned laterally. Guide vanes 20, 22 and 24 are attached to centerbody 25 which is selectively movable to the right or left. In the position shown in FIG. 4(b) the centerbody 25 has been moved to the left thereby moving guide vanes 20, 22, 24 to the left to provide the choked condition, which will minimize the air-flow rate by restricting the air-flow area. The actuating mechanism 26 may comprise any device that will move alternate guide vanes attached thereto programmed amounts as required to choke or partially choke within the design range of the compressor.

Figure 5:
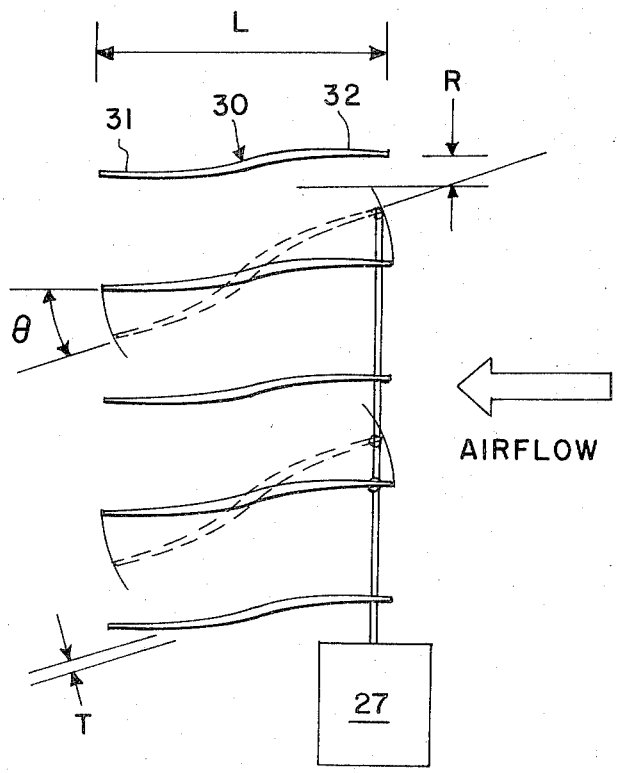
FIG. 5 shows another guide vane configuration according to the invention.

FIG. 5 illustrates another embodiment of the invention showing guide vanes 30 in the air-flow path. The solid line position of guide vanes 30 show their normal or unchoked condition. The choked condition can be obtained by pivoting alternate guide vanes 30 about their own centers, to the positions thereof shown in broken lines. The configuration of guide vanes 30 shown in FIG. 5 is somewhat different from the configuration of guide vanes 11 shown in FIG. 3. Thus straight end portions 31 and 32 of guide vanes 30 of FIG. 5 are not in the same longitudinal plane, but are located in substantially parallel longitudinal planes. The designations T, R and L correspond however to the same designations explained with reference to FIG. 1, and the designation angle $\theta$ indicates the angular deviation of alternate guide vanes 30 from their unchoked position as shown by the solid line guide vane configuration, to their choked position as shown by the broken line configuration of guide vanes 30. As in the previous embodiment alternate may mean an arrangement other than every other vane. An actuator mechanism 27 to actuate the guide vanes 30 of FIG. 5 between choked and unchoked condition would also be utilized to rotate alternate vanes 30 about their own centers a programmed amount as required to choke or partially choke within the design range of the compressor. The actuator mechanism 27 may be housed within the centerbody, and would have additional linkage to cause guide vane rotation.

The guide vane structures of FIGS. 3 and 5 do not show any prewhirl being added to the air flow, but prewhirl could be easily added along the guide vanes or at their trailing edges without affecting the choking principle. It is to be understood that although this device is primarily intended for use on inlets of aircraft engines, it could also be used in any duct to attenuate noise being transmitted upstream through the air in the duct.

What is claimed is:

1. In an axial-flow-air compressor having air inlet means and a plurality of similarly configured inlet guide vanes positioned symmetrically therein, the improvement comprising:

a radially and symmetrically positioned plurality of tapered inlet guide vanes in the inlet of an axial-flow-air compressor, capable of adding prewhirl to air flowing therein, each of the plurality of guide vanes being relatively elongated along its longitudinal cross-sectional dimension and defining a central raised portion in the form of an underchambered hump along said dimension, positioning means operable to position the plurality of guide vanes in parallel cross-sectional alignment with corresponding points on said humps being substantially coplanar to provide an unchoked condition for the air flow, said positioning means being further selectively operable to simultaneously move the selected ones of the plurality of guide vanes out of said alignment wherein selected humps of the plurality of guide vanes are misaligned to constrict the flow of air to provide a choked condition causing a sonic barrier to be formed which reduced the transmission of noise in a direction opposed to the direction of air flow.

2. The axial-flow-air compressor recited in claim 1 wherein each of the plurality of inlet guide vane cross-sections comprises substantially straight end portions joined together by said raised portion in the form of an underchambered hump.

3. The axial-flow-air compressor recited in claim 2 wherein each of the plurality of inlet guide vane cross-sections is tapered to increase in thickness from their straight end portions toward the center of the raised portion, the latter being the thickest dimension thereof.

4. The axial-flow-air compressor recited in claim 3 wherein the longitudinal axes of the inlet guide vane cross-sections straight end portions are located in the same plane.

5. The axial-flow-air compressor recited in claim 3 wherein the longitudinal axes of the inlet guide vane cross sections straight end portions are located in parallel planes.

6. The axial-flow-air compressor recited in claim 1 wherein the positioning means move alternate ones of the plurality of inlet guide vanes out of the said parallel cross-section alignment by movement thereof in an axial direction.

7. In an axial-flow-air compressor having air inlet means and a plurality of similarly configured inlet guide vanes positioned symmetrically therein, the improvement comprising:

A radially and symmetrically positioned plurality of tapered inlet guide vanes in the inlet of an axial-flow-air compressor, capable of adding prewhirl to air flowing therein, each of the plurality of guide vanes being relatively elongated along its longitudinal cross-sectional dimension and defining a central curved portion along said dimension, positioning means operable to position the plurality of guide vanes in parallel cross-sectional alignment to provide an unchoked condition for the air flow, said positioning means being further selectively operable to simultaneously move selected guide vanes out of said alignment by pivoting said selected guide vanes about their own longitudinal axes wherein selected curved portions of the plurality of guide vanes are misaligned to constrict the flow of air to provide a choked condition causing a sonic barrier to be formed which reduces the transmission of noise in a direction opposed to the direction of air flow.

* * * * *